(12) United States Patent
Vajo et al.

(10) Patent No.: US 7,601,329 B2
(45) Date of Patent: Oct. 13, 2009

(54) REGENERATION OF HYDROGEN STORAGE SYSTEM MATERIALS AND METHODS INCLUDING HYDRIDES AND HYDROXIDES

(75) Inventors: John J Vajo, Westhills, CA (US); Florian O Mertens, Birmingham, MI (US); Scott W Jorgensen, Bloomfield Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 960 days.

(21) Appl. No.: 10/787,617

(22) Filed: Feb. 26, 2004

(65) Prior Publication Data

US 2005/0191235 A1 Sep. 1, 2005

(51) Int. Cl.
*C01B 3/00* (2006.01)
(52) U.S. Cl. .............. 423/658.2; 423/644; 423/645; 423/646; 423/647; 423/648.1; 423/657
(58) Field of Classification Search ........... 423/644, 423/648.1, 657, 658.2, 645, 646, 647
See application file for complete search history.

(56) References Cited

U.S. PATENT DOCUMENTS

| | | | |
|---|---|---|---|
| 2,446,780 A * | 8/1948 | Newton | 423/255 |
| 3,405,068 A | 10/1968 | Hiltz | |
| 4,840,749 A * | 6/1989 | Ikeda et al. | 552/238 |
| 5,678,410 A | 10/1997 | Fujita et al. | |
| 6,015,041 A | 1/2000 | Heung | |
| 6,152,982 A * | 11/2000 | Froes et al. | 75/343 |
| 6,159,538 A | 12/2000 | Rodriguez et al. | |
| 6,267,229 B1 | 7/2001 | Heung | |
| 6,329,076 B1 | 12/2001 | Kawabe et al. | |
| 6,342,198 B1 | 1/2002 | Zaluska et al. | |
| 6,358,488 B1 | 3/2002 | Suda | 423/657 |
| 6,419,764 B1 | 7/2002 | Kamiya et al. | |
| 6,432,379 B1 | 8/2002 | Heung | |
| 6,444,361 B1 | 9/2002 | Komori et al. | |
| 6,471,936 B1 * | 10/2002 | Chen et al. | 423/658.2 |
| 6,534,033 B1 * | 3/2003 | Amendola et al. | 423/648.1 |
| 6,939,529 B2 | 9/2005 | Strizki et al. | 423/658.2 |
| 7,052,671 B2 * | 5/2006 | McClaine et al. | 423/658.2 |
| 2003/0113252 A1 | 6/2003 | Chen et al. | |

(Continued)

FOREIGN PATENT DOCUMENTS

EP 0 989 290 A2 3/2000

(Continued)

OTHER PUBLICATIONS

Gmelins Handbuch, Der Anorganischen Chemie, Wasserstoff, Mit 3 Figuren, System-Nummer 2, 1927, Berlin, Verlag Chemie G.M.B.H.

(Continued)

*Primary Examiner*—Stanley Silverman
*Assistant Examiner*—Paul Wartalowicz
(74) *Attorney, Agent, or Firm*—Reising Ethington P.C.

(57) ABSTRACT

In one aspect, the invention provides a hydrogen storage composition having a hydrogenated state and a dehydrogenated state. In the hydrogenated state, such composition comprises a hydride and a hydroxide. In a dehydrogenated state, the composition comprises an oxide. The present invention also provides methods of and compositions for regenerating a species of a hydroxide and a hydride material.

97 Claims, 4 Drawing Sheets

U.S. PATENT DOCUMENTS

| | | |
|---|---|---|
| 2003/0129122 A1 | 7/2003 | Chen et al. |
| 2003/0129126 A1 | 7/2003 | Chen et al. |
| 2004/0028936 A1* | 2/2004 | Kogiso et al. ............... 428/606 |
| 2004/0033194 A1* | 2/2004 | Amendola et al. ....... 423/658.2 |
| 2005/0069486 A1* | 3/2005 | Shaw ..................... 423/658.2 |

FOREIGN PATENT DOCUMENTS

| | | |
|---|---|---|
| GB | 1148048 | 4/1969 |

OTHER PUBLICATIONS

Gmelins Handbuch, Der Anorganischen Chemie, Natrium, Erganzungsband, Lieferung 2, Mit 66 Figuren, System-No. 21, 1965, Verlag Chemie, GMBH.

Sandia National Labs, "Hydride Materials Data Base" website, pp. 1-4; printed Mar. 12, 2004.

Hera "Storage of Hydrogen In Reversible Metal Hydrides" pp. 1-3; printed Mar. 17, 2004.

Pinkerton, et al., "Bottling The Hydrogen Genie", The Industrial Physicist, American Institute of Physics; pp. 20-23 (Feb./Mar. 2004).

Chen, Ping, Xiong, Zhitao, Luo, Jizhong, Lin, Jianyi, Tan, Kuang Lee. "Hydrogen Storage in Metal Nitride Systems". Edited by Ricardo B. Schwartz, Symposium V, Materials for Energy Storage, Generation and Transport, vol. 730, Apr. 2-4, 2002, pp. 376 and 385, V5.18.

Herbert Jacobs and Robert Juza, "Preparations and Properties of Magnesium Amide and Imide" Journal for Anorganic and General Chemistry, Band [vol.] 870 (1969) pp. 254-261. (English translation only; original German not available.).

Chen, Ping, Xiong, Zhitao, Luo, Jizhong, Lin, Jianyi, Tan, Kuang Lee. "Interaction of Hydrogen with Metal Nitrides and Imides" Nature Publishing Group [vol. 420] (Nov. 21, 2002) pp. 302-304 with Supplement pp. 1-6.

Robert Juza and Karl Opp, Metal Amides and Metal Nitrades, 25th Part 1), Journal for Anorganic and General Chemistry. 1951 Band vol. 266, pp. 325-330. (2 documents: English translation and original German.).

PCT International Search Report mailed Jul. 27, 2006; PCT/US05/02353 filed Jan. 27, 2005.

* cited by examiner

REGENERATION OF HYDROGEN STORAGE SYSTEM MATERIALS AND METHODS INCLUDING HYDRIDES AND HYDROXIDES

FIELD OF THE INVENTION

The present invention relates to hydrogen storage compositions, the method of making such hydrogen storage compositions and use thereof.

BACKGROUND OF THE INVENTION

Hydrogen is desirable as a source of energy because it reacts cleanly with air producing water as a by-product. In order to enhance the desirability of hydrogen as a fuel source, particularly for mobile applications, it is desirable to increase the available energy content per unit volume and per unit mass of storage. Presently, this is done by conventional means such as storage under high pressure, at thousands of pounds per square inch (e.g., 5,000 to 10,000 psi), cooling to a liquid state, or absorbing into a solid such as a metal hydride. Pressurization and liquification require relatively expensive processing and storage equipment.

Storing hydrogen in a solid material such as metal hydrides, provides volumetric hydrogen density which is relatively high and compact as a storage medium. Binding the hydrogen as a solid is desirable since it desorbs when heat is applied, thereby providing a controllable source of hydrogen.

Rechargeable hydrogen storage devices have been proposed to facilitate the use of hydrogen. Such devices may be relatively simple and generally are simply constructed as a shell and tube heat exchanger where the heat transfer medium delivers heat for desorption. Such heat transfer medium is supplied in channels separate from the chamber which houses the hydrogen storage material. Therefore, when hydrogen release is desired, fluids at different temperatures may be circulated through the channels, in heat transfer relationship with the storage material, to facilitate release of the hydrogen. For certain materials, recharging the storage medium can be achieved by pumping hydrogen into the chamber and through the storage material while the heat transfer medium removes heat, thus facilitating the charging or hydrogenating process. An exemplary hydrogen storage material and storage device arranged to provide suitable heat transfer surface and heat transfer medium for temperature management is exemplified in U.S. Pat. No. 6,015,041.

Presently, the selection of relatively light weight hydrogen storage material is essentially limited to magnesium and magnesium-based alloys which provide hydrogen storage capacity of several weight percent, essentially the best known conventional storage material with some reversible performance. However, such magnesium based materials have a limitation in that they take up hydrogen at very high temperature and high hydrogen pressure. In addition, hydrogenation of the storage material is typically impeded by surface oxidation of the magnesium. Other examples, such as $LaNi_5$ and TiFe, have relatively low gravimetric hydrogen storage density, since they are very heavy.

Therefore, in response to the desire for an improved hydrogen storage medium, the present invention provides an improved hydrogen storage composition, its use as a storage medium and a method for forming such materials.

SUMMARY OF THE INVENTION

In one aspect, the invention provides a method for releasing hydrogen from hydrogen storage materials comprising conducting a hydrogen production reaction by reacting a hydrogen storage material composition with a second hydrogen storage material composition, for a time and at a temperature sufficient to produce hydrogen ($H_2$) and an oxide composition. The first hydrogen storage material comprises a hydride and the second hydrogen storage material comprises a hydroxide having one or more cationic species other than hydrogen. A regeneration reaction is conducted utilizing the oxide composition to form a species of a hydride or a hydroxide.

In another aspect, the invention provides a method of producing a source of hydrogen gas comprising conducting a hydrogen production reaction in a hydrogenated starting material composition comprising a hydride and a hydroxide having one or more cationic species other than hydrogen, to produce hydrogen gas and a dehydrogenated reaction product comprising an oxide. A regeneration reaction is conducted by utilizing the dehydrogenated reaction product to form a hydrogenated material.

In still another aspect of the invention, there is provided a method for releasing hydrogen from hydrogen storage materials comprising conducting an exothermic hydrogen production reaction between a first hydrogen storage material and a second hydrogen storage material to produce hydrogen and a byproduct material comprising an oxide, where the first hydrogen storage material comprises a hydride composition represented by $MI^xH_x$, and where the second hydrogen storage material comprises a hydroxide composition represented by $MII^y(OH)_y$. MI and MII represent a cationic species or a mixture of cationic species other than hydrogen, and where x and y represent average valence states of respectively MI and MII. A regeneration reaction is conducted with the oxide composition to form a species of either a hydride or a hydroxide.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
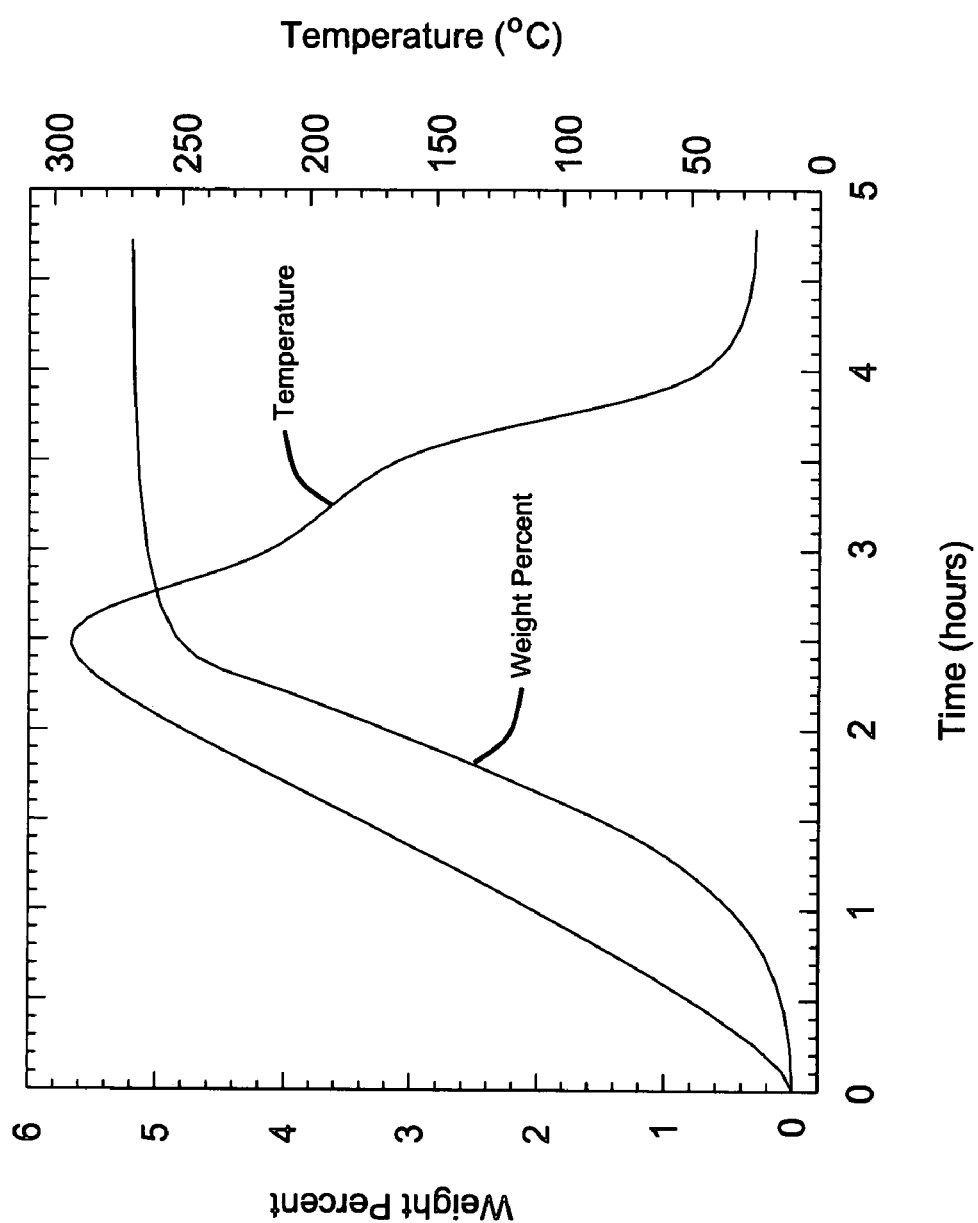
FIG. 1 shows hydrogen production by weight percent loss of hydrogen from a hydrogen storage material comprising lithium hydride and lithium hydroxide analyzed by a modified volumetric Sievert's apparatus analysis.

The following description of the preferred embodiment(s) is merely exemplary in nature and is in no way intended to limit the invention, its application, or uses.

In one aspect, the present invention provides methods of producing and releasing hydrogen from a hydrogen storage material system. In one preferred embodiment, a method is provided for releasing hydrogen from hydrogen storage materials by conducting a hydrogen production reaction by reacting a hydride composition and a hydroxide composition having one or more cations other than hydrogen. The hydrogen production reaction produces hydrogen and a reaction byproduct comprising an oxide composition. The present invention further provides regenerating a species of a hydride or a hydroxide by conducting one or more regeneration reactions on the oxide composition to enable regeneration of at least a portion of the starting materials. As used herein, the term "composition" refers broadly to a substance containing at least the preferred chemical compound, but which may also comprise additional substances or compounds, including impurities. The term "material" also broadly refers to matter containing the preferred compound or composition. Other preferred embodiments of the present invention relate to methods of from hydrogen storage compositions, as will be discussed in greater detail below.

In another aspect, the present invention provides hydrogen storage materials. In one preferred embodiment of the present invention, a hydrogen storage composition has a hydrogenated state and a dehydrogenated state, therein providing two distinct physical states where hydrogen can be stored and subsequently released. In the hydrogenated state, the composition comprises a hydride and a hydroxide. In the dehydrogenated state, the composition comprises an oxide.

In one preferred embodiment of the present invention, the hydride is represented by the general formula $MI^xH_x$, where MI represents one or more cationic species other than hydrogen, and x represents the average valence state of MI, where the average valence state maintains the charge neutrality of the compound.

In another preferred embodiment of the present invention, the hydroxide is represented by the general formula $MII^y(OH)_y$, where MII represents one or more cationic species other than hydrogen, and y represents the average valence state of MII where the average valence state maintains the charge neutrality of the compound.

In yet another preferred embodiment of the present invention, the hydride composition is represented by $MI^xH_x$ and the hydroxide composition is represented by $MII^y(OH)_y$, where MI and MII respectively represent one or more cationic species other than hydrogen, and x and y represent average valence states of MI and MII, and where the average valence states maintain the charge neutrality of the compounds, respectively.

In accordance with the present invention, MI and MII each represent one or more of a cationic species or a mixture of cationic species other than hydrogen. It should be noted that MI and MII are independently selected from one another. Thus, the present invention contemplates MI and MII comprising the same cationic species, or in alternate preferred embodiments, MI and MII comprise distinct cationic species that are different from one another. Further, MI, MII, or both may be selected to be complex cations, which comprise two or more distinct cationic species. In the case where MI, MII, or both are complex cations, MI and MII may comprise one or more of the same cationic species, or may have entirely distinct cationic species from one another. Hydrides are often referred to as complex hydrides, which are further contemplated in the present invention. A complex hydride comprises two cationic species, however one of the cationic species forms an anionic group with hydrogen, which further interacts with a second cationic species. This concept can be expressed by the following formula with a hydride expressed as $MI^xH_x$, where MI comprises two distinct cationic species, M' and M", so that MI=M'+M". Thus, the hydride can be expressed as: $M'_d{}^a(M'''^bH_c)_a{}^{-d}$ where $(M'''^bH_c)$ is an anionic group, where d=(c−b) and a, b, c, and d are selected so as to maintain charge balance and electroneutrality of the compound. Cationic species that are preferred for all the preferred embodiments of the present invention include metal cations, as well as non-metal cations such as boron. Further, MII is also optionally selected to be an organic cationic group non-metal cation, such as $CH_3$.

Elements that form preferred cations and mixtures of cations for MI and MII in the type of compounds of the present invention are as follows. For both hydrides and hydroxides, certain preferred cationic species comprise: aluminum (Al), boron (B), barium (Ba), beryllium (Be), calcium (Ca), cesium (Cs), potassium (K), lithium (Li), magnesium (Mg), sodium (Na), rubidium (Rb), silicon (Si), strontium (Sr), titanium (Ti), vanadium (V), and mixtures thereof. Particularly preferred elements comprise: aluminum (Al), boron (B), beryllium (Be), calcium (Ca), potassium (K), lithium (Li), magnesium (Mg), sodium (Na), strontium (Sr), titanium (Ti), and mixtures thereof. The most preferred cationic species are Li and Na. Evaluation of the aforesaid known species produces, by analogy, the following added cationic species besides those recited above which are thought to be usable based on predictive thermodynamics, but not yet demonstrated, include arsenic (As), cadmium (Cd), cerium (Ce), europium (Eu), iron (Fe), gallium (Ga), gadolinium (Gd), germanium (Ge), hafnium (Hf), mercury (Hg), indium (In), lanthanum (La), manganese (Mn), neodymium (Nd), nickel (Ni), lead (Pb), praseodymium (Pr), antimony (Sb), scandium (Sc), selenium (Se), samarium (Sm), tin (Sn), thorium (Th), thallium (Tl), tungsten (W), yttrium (Y), ytterbium (Yb), zinc (Zn), zirconium (Zr). For MII, another feasible cationic species comprises low molecular weight organic groups, such as methyl ($CH_3$), ethyl ($C_2H_5$), and propyl ($C_3H_7$) groups.

In view of the above, the cationic species MI or MII generally comprise: aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), tungsten (W), yttrium (Y), ytterbium (Yb), zinc (Zn), and zirconium (Zr). Additionally, MII may comprise an organic cationic species, such as methyl ($CH_3$), ethyl ($C_2H_5$), and propyl ($C_3H_7$) groups.

In preferred embodiments of the present invention, a solid-state hydride composition (i.e., in particulate form) reacts with a hydroxide composition (i.e., in particulate form) via a solid-state reaction to produce and release gaseous hydrogen and a solid-state byproduct compound comprising an oxide. Where the hydride composition is selected as $MI^xH_x$ and the hydroxide composition is selected as MII$^y$(OH)$_y$, the hydrogen production reaction proceeds by the following reaction mechanism:

$$yMI^xH_x + xMII^y(OH)_y \rightarrow xyH_2 + \left(\frac{xy}{2}\right)MI_{\frac{2}{x}}O + \left(\frac{xy}{2}\right)MII_{\frac{2}{y}}O$$

where as previously discussed, x is the average valence state of MI and y is the average valence state of MII where the average valence states maintain the charge neutrality of the respective compounds. Thus, the hydrogenated state of the hydrogen storage composition corresponds to the hydrogenated hydride and hydrogenated hydroxide, and the dehydrogenated hydrogen storage composition corresponds to the one or more byproduct compounds comprising an oxide. It should be noted that where MI and MII are the same cationic species, which can be represented by M, the above reaction mechanism can be simplified to:

$$M^zH_z + M^z(OH)_z \rightarrow zH_2 + zM_{\frac{2}{z}}O$$

where z represents the average valence state of M, where the average valence state maintains the charge neutrality of the compound.

According to the present invention, it is preferred that at least one byproduct composition comprises an oxide having one or more cationic species of the hydroxide and hydride (i.e., MI, MII, or both). The independent selection of cationic species can vary the stoichiometry of the reaction and the types of byproduct compounds formed. It should be noted that the oxide byproduct compounds $$MI_{\frac{2}{x}}O$$

and $$MII_{\frac{2}{y}}O$$

(or $$M_{\frac{2}{z}}O$$

in the case there MI and MII are the same cation M) may thermodynamically favor forming and/or decomposing into different byproduct compounds. Further, with certain reactants and stoichiometry of the reactants, such oxide byproduct compounds may also comprise higher-order complex hydrides, for example, as will be described in more detail below. These further byproducts are formed of the same general constituents as the primary byproducts, but they have different valence states, atomic ratios, or stoichiometry, depending on the cationic species involved, as recognized by one of skill in the art.

In certain preferred embodiments of the present invention the hydrogen storage composition comprises a hydride selected from the group consisting of: lithium hydride (LiH), sodium hydride (NaH), potassium hydride (KH), beryllium hydride (BeH$_2$), magnesium hydride (MgH$_2$), calcium hydride (CaH$_2$), strontium hydride (SrH$_2$), titanium hydride (TiH$_2$), aluminum hydride (AlH$_3$), boron hydride (BH$_3$), and mixtures thereof. Particularly preferred hydride compositions comprise LiH or NaH.

In alternate preferred embodiments of the present invention the hydrogen storage composition comprises a hydride which is a complex hydride selected from the group consisting of: lithium borohydride (LiBH$_4$), sodium borohydride (NaBH$_4$), magnesium borohydride (Mg(BH$_4$)$_2$), calcium borohydride (Ca(BH$_4$)$_2$), lithium alanate (LiAlH$_4$), sodium alanate (NaAlH$_4$), magnesium alanate (Mg(AlH$_4$)$_2$), calcium alanate (Ca(AlH$_4$)$_2$), and mixtures thereof. Particularly preferred complex hydrides comprise lithium borohydride (LiBH$_4$), sodium borohydride (NaBH$_4$), lithium alanate (LiAlH$_4$), and sodium alanate (NaAlH$_4$).

Further, other preferred embodiments of the present invention, comprise a hydroxide composition selected from the group consisting of: lithium hydroxide (LiOH), sodium hydroxide (NaOH), potassium hydroxide (KOH), beryllium hydroxide (Be(OH)$_2$), magnesium hydroxide (Mg(OH)$_2$), calcium hydroxide (Ca(OH)$_2$), strontium hydroxide (Sr(OH)$_2$), titanium hydroxide (Ti(OH)$_2$), aluminum hydroxide (Al(OH)$_3$), boron hydroxide (B(OH)$_3$) which is also known as boric acid and more conventionally is expressed as (H$_3$BO$_3$), and mixtures thereof. Particularly preferred hydroxide compounds comprise LiOH and NaOH.

Thus, according to one preferred embodiment of the present invention, a hydrogen production reaction is conducted by reacting a hydride comprising LiH with a hydroxide comprising LiOH. The reaction proceeds according to the reaction mechanism:

LiH+LiOH→Li$_2$O+H$_2$.

This reaction produces a theoretical 6.25 weight % of hydrogen on a material basis.

In an alternate preferred embodiment of the present invention a hydrogen production reaction occurs by reacting a hydride comprising NaH with a hydroxide comprising LiOH. The reaction mechanism for this reaction can be expressed as NaH+LiOH→½Li$_2$O+½Na$_2$O+H$_2$.

This reaction generates a theoretical 4.1 weight % hydrogen on a material basis. It should be noted that the byproduct compounds are generally expressed as Li$_2$O and Na$_2$O, however, mixed or partially mixed metal oxides may form based on the conditions at which the reaction takes place, and may be thermodynamically favored. Thus, for example, the byproduct composition may comprise an oxide composition comprising a mixed cation oxide $$\left(MI^xMII^y_{\frac{2}{x+y}}O\right)$$

formed as a byproduct, where x and y are the average valence states of MI and MII, respectively, and where the average valence state maintains the charge neutrality of the compound. In such a case, the above reaction may form LiNaO as a byproduct compound. The mixed cation oxide byproduct compound may comprise the entire oxide product, or may be mixed with the single cation oxides to result in multiple distinct oxide byproduct compounds, depending on the thermodynamics of the reaction.

In certain preferred embodiments of the present invention, the reaction mechanism for producing hydrogen from the hydride and hydroxide is reversible. By "reversible" it is meant that a species of a starting material hydroxide or hydride is regenerated at temperature and pressure conditions which are economically and industrially useful and practicable. Particularly preferred "reversible" reactions include those where exposing one or more byproduct compounds to hydrogen regenerates a species of a starting material hydroxide or hydride. In the same manner, a "non-reversible reaction" generally applies to both reactions that are irreversible via the reaction mechanism pathway, and also to those reactions where regenerating a species of a starting material hydride or hydroxide by exposure to hydrogen is carried out at impractical processing conditions, such as, extreme temperature, extreme pressure, or cumbersome product removal, which prevents its widespread and practical use. Endothermic hydrogen formation reactions according to the present invention are generally reversible at desirable temperature and pressure conditions.

One aspect of the present invention is a reduction in the overall energy requirements for a system of storing and subsequently releasing hydrogen. Minimizing the overall enthalpy changes associated with the hydrogen storage material system results in an improvement of the overall efficiency of the fuel cell system. As the overall enthalpy change increases, so do the requirements for managing heat transfer systems (heating and cooling operations). In particular, it is highly advantageous to minimize heating and cooling systems in mobile units containing fuel cells (e.g., vehicles or electronic devices), because additional systems draw parasitic energy and increase the overall weight of the mobile unit, thereby decreasing its gravimetric efficiency.

Other advantages of minimizing overall enthalpy change in the hydrogen storage system are often realized during start-up and other transient conditions (e.g., low load conditions), because there is less diversion of energy from other important system operations. Thus, one aspect of the present invention is a minimization of the overall energy necessary to both produce and regenerate a hydrogen storage material. In preferred embodiments of the present invention, the energy required for hydrogen production and recharge is relatively low, and vastly improved when compared to energy requirements of prior art hydrogen storage systems.

As previously discussed, one preferred embodiment of the present invention comprises a hydrogen storage composition where the hydride is lithium hydride LiH and the hydroxide is lithium hydroxide LiOH, which react with one another to form $Li_2O$ and $H_2$. The enthalpy of reaction ($\Delta H_r$) for the hydrogen production reaction was calculated based on the standard heat of formation ($\Delta H_f$) for each of the compounds, and resulted in theoretical $\Delta H_r$ of −23.3 kJ/mol-$H_2$. This $\Delta H_r$ indicates an exothermic reaction, with a relatively low enthalpy (and thus a low level of heat production). Minimizing the amount of heat released into the fuel cell system is preferred, because larger enthalpies result in larger quantities of emitted heat, which must be controlled by cooling systems to prevent damage to the surrounding environment, especially in a fuel cell system where certain components (e.g., control circuitry or the membrane exchange assembly (MEA)) potentially degrade upon exposure to higher temperatures. As the enthalpy of the reaction increases, the size and complexity of the heat transfer system becomes much larger. Further, larger heats of reaction have the potential to be less controllable and often cannot be stopped prior to complete reaction. The present embodiment thus provides a relatively low exothermic heat of reaction for the hydrogen production reaction. An exothermic hydrogen production reaction has an advantage of not requiring a sustained input of external energy from the fuel cell system for hydrogen generation (aside from any activation energy necessary to initiate the reaction, as will be discussed in more detail below). It is preferred that the heat released by the hydrogen generation reaction is dissipated by a heat transfer system, as it is preferred to maintain the storage materials at a constant temperature during the reaction. However, the present embodiment does not require an extensive cooling system and further provides good control over the reaction as it proceeds.

Other preferred embodiments according to the present invention have an exothermic hydrogen production reaction and include reactions between a hydride composition $MI^xH_x$ and a hydroxide composition $MII^y(OH)_y$, where MI and MII are selected to be the same cationic species selected from the group consisting of Al, B, Be, Ca, Mg, Sr, and Ti. These reactions have a higher enthalpy of reaction $\Delta H_r$ than the previous embodiment, and include for example, the following reactions. Where the hydride is selected to be $MgH_2$ and the hydroxide is selected to be $Mg(OH)_2$, the reaction can be expressed as:

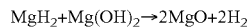
$$MgH_2 + Mg(OH)_2 \rightarrow 2MgO + 2H_2$$

which has a $\Delta H_r$ of −101.3 kJ/mol-$H_2$ and a theoretical hydrogen production of 4.7 wt. %. Where the hydride is selected to be $AlH_3$ and the hydroxide is selected to be $Al(OH)_3$, the reaction can be expressed as:

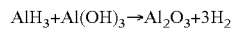
$$AlH_3 + Al(OH)_3 \rightarrow Al_2O_3 + 3H_2$$

which has a $\Delta H_r$ of −129.3 kJ/mol-$H_2$ and a theoretical hydrogen production of 5.5 wt. %. In the case where the hydride is selected to be $CaH_2$ and the hydroxide is selected to be $Ca(OH)_2$, the reaction can be expressed as:

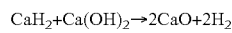
$$CaH_2 + Ca(OH)_2 \rightarrow 2CaO + 2H_2$$

which has a $\Delta H_r$ of −53.7 kJ/mol-$H_2$ and a theoretical hydrogen production of 3.4 wt. %. Where the hydride is selected to be $SrH_2$ and the hydroxide is selected to be $Sr(OH)_2$, the reaction can be expressed as:

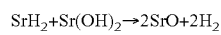
$$SrH_2 + Sr(OH)_2 \rightarrow 2SrO + 2H_2$$

which has a $\Delta H_r$ of −17.7 kJ/mol-$H_2$ and a theoretical hydrogen production of 1.9 wt. %. Where the hydride is selected to be $BH_3$ and the hydroxide is selected to be $B(OH)_3$, the reaction can be expressed as:

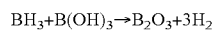
$$BH_3 + B(OH)_3 \rightarrow B_2O_3 + 3H_2$$

which has a $\Delta H_r$ of 94.9 kJ/mol-$H_2$ and a theoretical hydrogen production of 7.9 wt. %. Where the hydride is selected to be $BeH_2$ and the hydroxide is selected to be $Be(OH)_2$, the reaction can be expressed as:

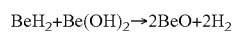
$$BeH_2 + Be(OH)_2 \rightarrow 2BeO + 2H_2$$

which has a $\Delta H_r$ of −147.4 kJ/mol-$H_2$ and a theoretical hydrogen production of 7.4 wt. %.

An additional exothermic hydrogen production reaction according to the present invention comprises reacting lithium hydride (LiH) with boron hydroxide ($B(OH)_3$) (which is more typically known as boric acid and expressed as $H_3BO_3$), which under certain pressure, temperature, and other reaction conditions proceeds by the following reaction mechanism:

$$3LiH + H_3BO_3 \rightarrow LiBO_2 + Li_2O + 3H_2$$

which has a $\Delta H_r$ of −84.2 kJ/mol-$H_2$ and a theoretical hydrogen production of 6.9 wt. %. Under different pressure, temperature, and other reaction conditions, the same reactants can proceed according to the following reaction mechanism, where the oxide product differs from the two oxide products above (i.e., $LiBO_2$ and $Li_2O$), and forms a single complex higher order oxide product ($Li_3BO_3$):

$$3LiH + H_3BO_3 \rightarrow Li_3BO_3 + 3H_2$$

which likewise has a $\Delta H_r$ of −84.2 kJ/mol-$H_2$ and a theoretical hydrogen production of 6.9 wt. %.

Further preferred alternate embodiments of the present invention, are where the hydride composition is $M^IH_x$ and the hydroxide is $M^{II}(OH)_y$, where the hydride is a complex hydride $M'_d{}^a(M''{}^bH_c)^{-d}$ where M' is selected to be lithium and M" is selected to be boron, and the reaction is exothermic, include the following reactions. The first hydrogen production reaction occurs between:

$$LiBH_4 + 4LiOH \rightarrow LiBO_2 + 2Li_2O + 4H_2$$

where a theoretical 6.8 weight % of hydrogen is produced and the reaction has a $\Delta H_r$ of −22 kJ/mol-$H_2$. A second hydrogen production reaction with a complex hydride where M' is sodium and M" is boron, includes the reaction:

$$NaBH_4 + 2Mg(OH)_2 \rightarrow NaBO_2 + 2MgO + 4H_2$$

which produces a theoretical 5.2 weight % of hydrogen and a $\Delta H_r$ of −34 kJ/mol-$H_2$.

Another preferred embodiment of the present invention previously discussed is that where the hydride is sodium hydride (NaH) and the hydroxide is lithium hydroxide (LiOH). A calculated heat of reaction ($\Delta H_r$) is +9.7 kJ/mol-$H_2$, which indicates an endothermic heat of reaction, which is relatively small. Thus, producing hydrogen with this hydrogen storage material system would require only slight heating throughout the hydrogen production reaction. However, because the overall quantity of heat generated is relatively low, this embodiment is preferred for certain applications. The endothermic nature of the hydrogen production reaction allows for an exothermic recharging reaction.

In certain applications, this hydrogen storage material composition may be preferred because the regeneration reaction is generally reversible at relatively low temperature and pressure conditions. For example, a predicted equilibrium pressure for the byproduct material comprising oxide is approximately 1 bar at 50° C., thus upon exposure to pressurized hydrogen above the equilibrium pressure, the material will absorb and react with hydrogen to regenerate a species of the hydride and hydroxide: NaH and LiOH (and preferably both). It should be noted that in circumstances where the byproduct composition comprises a mixed cation oxide (LiNaO), the species of regenerated hydride and hydroxides may also comprise a species of hydride and hydroxide different from the starting material compositions, for example NaOH, LiH, or mixed cation hydrides and hydroxides, such as $LiNa(OH)_2$, for example. As recognized by one of skill in the art, when the materials are recharged to form different starting materials comprising a species of hydroxide and hydride, the hydrogen production reaction thermodynamics may change, such that the heat of reaction may likewise changes. The feasibility of recharging the hydrogen storage material with hydrogen at relatively low temperatures and pressures makes the present embodiment, and those with similar properties, desirable for mobile units, where the hydrogen storage material can be regenerated at the point-of-use (e.g., on-board), without need for further processing and reacting at an offsite facility.

Other preferred embodiments according to the present invention, where the hydrogen generation reaction is endothermic, include one where MI and MII are each selected to be sodium, such that the hydrogen production reaction proceeds according to the reaction mechanism:

$$NaH + NaOH \rightarrow Na_2O + H_2,$$

that has a theoretical hydrogen production amount of 3.1 weight %. The theoretical enthalpy of reaction $\Delta H_r$ is +67.4 kJ/mol-$H_2$. The present embodiment is likewise useful for on-board regeneration for a mobile unit, and has a predicted equilibrium pressure of 1 bar at 475° C. Another preferred embodiment is where MI and MII are selected to be potassium, and proceeds according to the reaction mechanism:

$$KH + KOH \rightarrow K_2O + H_2$$

with a theoretical hydrogen generation of 2.1 weight %. The theoretical enthalpy of reaction $\Delta H_r$ for the potassium hydroxide and potassium hydride hydrogen production reaction is +119.7 kJ/mol-$H_2$.

Further preferred alternate embodiments of the present invention, where the hydrogen production reaction is exothermic are where the hydride composition is $M^IH_x$ and the hydroxide is $M^{II}(OH)_y$, where the hydride is selected to be a complex hydride (i.e., $M'_d{}^a(M''{}^bH_c)^{-d}$, for example, $NaBH_4$, where M' is Na and M" is B) and the reaction is endothermic, include the following exemplary reaction:

$$NaBH_4 + 4NaOH \rightarrow NaBO_2 + 2Na_2O + 4H_2$$

which produces a theoretical 4.0 weight % and a +21 kJ/mol-$H_2$.

Alternate preferred embodiments of the present invention include varying the stoichiometry of the starting material reactant hydride and hydroxide to produce higher-order complex oxide products. Thus, for example, a complex hydride, such as for example, lithium borohydride ($LiBH_4$) reacts with a hydroxide, for example boron hydroxide $B(OH)_3$ (i.e., boric acid $H_3BO_3$) to form a higher-order complex oxide compound according to the following reaction mechanism:

$$3LiBH_4 + 4H_3BO_3 \rightarrow Li_3B_7O_{12} + 12H_2$$

which produces the complex higher-order oxide compound $Li_3B_7O_{12}$ and a theoretical 7.6 wt. % of hydrogen.

Yet another preferred embodiment comprises a hydroxide where MII is a relatively low molecular weight organic group, such as, methyl, ethyl, and propyl groups. One example of such a hydrogen production reaction, where the hydride composition is selected to be lithium hydride (LiH) and the hydroxide composition is selected to be methanol ($CH_3OH$) the reaction proceeds according to the following alcoholysis mechanism:

$$LiH + CH_3OH \rightarrow LiOCH_3 + H_2.$$

As appreciated by one of skill in the art, any number of variations of hydride and hydroxide combinations are contemplated by the present invention, and may include any number of combinations of MI and MII selections. Further, the hydroxide compositions or the hydride compositions may comprise mixtures of hydroxide or hydride compounds. For example, the hydroxide compositions may comprise a plurality of distinct hydroxide compounds (e.g. LiOH, NaOH) mixed with one another for reacting with a hydride composition. Thus, the embodiments disclosed above are merely exemplary of a wide range of species which are useful ith the hydrogen storage material composition of the overall present invention.

Another preferred embodiment of the present invention provides a hydroxide composition which comprises a hydrated hydroxide which reacts with a hydride. Many hydroxide compounds readily form hydrated compounds, due to their hydroscopic nature. It is preferred that the hydrated hydroxide compound comprises at least a portion of the hydroxide compound (i.e., that the starting material hydroxide is a mixture of non-hydrated hydroxide and hydrated hydroxide), or in an alternate embodiment that hydrated hydroxide comprises all of the hydroxide composition starting material. A hydrated hydroxide increases the density of hydrogen stored within the hydrogen storage material increases hydrogen content, but likewise increases the weight of the material and potentially increases the heat evolved. The heat evolved from the hydrated hydroxide compounds may be beneficial to offset certain endothermic reaction systems, thereby reducing the overall enthalpy and heat of reaction.

Although not wishing to be bound by any particular theory, it is theorized that the water of hydration attached to the hydroxide reacts with a portion of the hydride in a first exothermic initiation reaction, which produces heat and hydroxide. The remaining portion of hydride (now dehydrated) is available to react in a hydrogen production reaction with the hydroxide. Thus, the starting material compositions comprise a hydride $MI^xH_x$ and a hydrated hydroxide $MII^y(OH)_y \cdot wH_2O$, where y represents the average valence state of MII to maintain charge neutrality of the hydroxide compound and w represents a stoichiometric amount of water. A first portion of the hydride reacts with the hydration water to provide heat to the surrounding starting material and to form a hydroxide product. The remaining portion of the hydride reacts with the hydroxide which comprises the newly formed product from the initiation reaction, as well as the initial hydroxide provided in the starting material. Thus, the heat of reaction is more exothermic in the embodiment where the hydroxide is hydrated, versus the embodiment where the hydroxide is dehydrated.

The reaction proceeds according to the following:

$$(y+2w)MI^xH_x + xMII^y(OH)_y \cdot wH_2O \rightarrow \frac{x(y+2w)}{2}M_{\frac{2}{x}}O + \frac{xy}{2}MII_{\frac{2}{y}}O + \frac{x(y+2w)}{2}H_2$$

where as previously discussed, x is the average valence state of MI and y is the average valence state of MII, where the average valence state maintains the charge neutrality of the compound, and where w is a stoichiometric amount of water present in the hydrated hydroxide compound.

Preferred hydride compositions for the present embodiment are the same as those described above in previous embodiments. Particularly preferred hydride compounds comprise LiH, LiBH$_4$, NaBH$_4$, MgH$_2$, NaH, and mixtures thereof. Preferred hydrated hydroxide compounds comprise primarily the same cationic species as those discussed in the non-hydrated hydroxide embodiments above, including aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), tungsten (W), yttrium (Y), ytterbium (Yb), zinc (Zn), zirconium (Zr), and mixtures thereof.

Preferred hydrated hydroxide compounds according to the present invention include, by way of example, Ba(OH)$_2 \cdot$3H$_2$O, Ba(OH)$_2 \cdot$H$_2$O, KOH$\cdot$H$_2$O, NaOH$\cdot$H$_2$O. Particularly preferred hydrated hydroxide compounds comprise: LiOH$\cdot$H$_2$O and NaOH$\cdot$H$_2$O. The hydrated hydroxide may also form a complex cationic hydrated hydroxide compound comprising complex cationic species, such that MII comprises two cationic species. Examples of such complex cationic hydrated hydroxide compounds include, LiAl$_2$(OH)$_7 \cdot$2H$_2$O and Mg$_6$Al$_2$(OH)$_{18} \cdot$4H$_2$O. It should be noted that the quantity of water in the hydrated compound may comprise more than one molecule of water (i.e., that w, the stoichiometric ratio of water, may vary), depending on the hydroxide compound and its propensity for hydration. The present invention further contemplates mixtures of hydrated hydroxide compounds (as well, as alternate embodiments having mixtures of hydrated and non-hydrated hydroxide compounds, which were previously described above).

Certain preferred reactions according to the present embodiment, include those where a hydrated hydroxide compound reacts with a hydride compound. The following non-limiting examples are where the hydride composition is $MI^xH_x$ and the hydrated hydroxide is represented by $MII_y(OH)_y \cdot zH_2O$, and where MII is selected to be lithium:

$$3LiH + LiOH \cdot H_2O \rightarrow 2Li_2O + 3H_2$$

which produces a theoretical 9.0 weight % and a $\Delta H_r$ of −45.2 kJ/mol-H$_2$. Another reaction according to the present embodiment is where:

$$3MgH_2 + 2LiOH \cdot H_2O \rightarrow 3MgO + Li_2O + 6H_2$$

which produces a theoretical 7.4 weight % and a $\Delta H_r$ of −99 kJ/mol-H$_2$. Yet another reaction with a hydrated hydroxide is as follows:

$$6NaH + 2LiOH \cdot H_2O \rightarrow 3Na_2O + Li_2O + 6H_2$$

which produces a theoretical 5.3 weight % and a $\Delta H_r$ of +11 kJ/mol-H$_2$. Yet another reaction is:

$$3LiBH_4 + 4LiOH \cdot H_2O \rightarrow 3LiBO_2 + 2Li_2O + 12H_2$$

which produces a theoretical 10.2 weight % and an exothermic $\Delta H_r$ of −43.5 kJ/mol-H$_2$.

Similar examples of reactions where the hydrated hydroxide comprises MII selected to be sodium proceed as follows:

$$6LiH + 2NaOH \cdot H_2O \rightarrow 3Li_2O + Na_2O + 6H_2$$

which produces a theoretical 7.3 weight % and an exothermic $\Delta H_r$ of −34.2 kJ/mol-H$_2$. A similar reaction which is endothermic is as follows:

$$3NaH + NaOH \cdot H_2O \rightarrow 2Na_2O + 3H_2$$

which produces a theoretical 4.6 weight % and a $\Delta H_r$ of +22.0 kJ/mol-H$_2$. Another preferred exothermic reaction is as follows:

$$3NaBH_4 + 4NaOH \cdot H_2O \rightarrow 3NaBO_2 + 2Na_2O + 12H_2$$

which produces a theoretical 6.9 weight % and an exothermic $\Delta H_r$ of −21.4 kJ/mol-H$_2$.

Alternate preferred embodiments of the present invention contemplate a mixture of starting material hydroxide comprising hydrated hydroxide and non-hydrated hydroxide starting materials which react with hydrides to produce hydrogen and a "complex oxide", meaning the oxide has higher order atomic ratio of oxygen to cationic species as compared to the simple oxides of the previous embodiments, as recognized by one of skill in the art. Such a reaction system includes both the general reaction of the hydride plus hydroxide (a first hydrogen generation reaction)

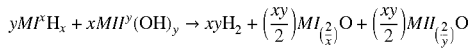
$$yMI^xH_x + xMII^y(OH)_y \rightarrow xyH_2 + \left(\frac{xy}{2}\right)MI_{\left(\frac{2}{x}\right)}O + \left(\frac{xy}{2}\right)MII_{\left(\frac{2}{y}\right)}O$$

and the hydride plus hydrated hydroxide (a second hydrogen generation reaction)

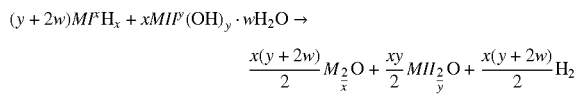
$$(y + 2w)MI^xH_x + xMII^y(OH)_y \cdot wH_2O \rightarrow$$
$$\frac{x(y+2w)}{2}M_{\frac{2}{x}}O + \frac{xy}{2}MII_{\frac{2}{y}}O + \frac{x(y+2w)}{2}H_2$$

where the starting reactant material compositions, comprising hydrides, hydroxides, and hydrated hydroxides, can be combined in any number of proportions to conduct both the first and second hydrogen generations concurrently. With such a combination of reactions, the amount of heat release can be designed by accounting for the quantities of reactants added and the corresponding heat of reaction for both the first and second hydrogen production reactions. Generally, the second hydrogen generation reaction where hydrated hydroxide reacts with a hydride is generally more exothermic than the first hydrogen generation reaction where a non-hydrated hydroxide reaction with a hydride.

Thus, reaction systems, such as those described above, comprise a combination of reactions for both hydrated hydroxide and non-hydrated hydroxides that are useful in designing a reaction to have a targeted overall heat of reaction. As previously discussed, one aspect of the present invention is the minimization of the overall enthalpy of the reaction system, which can be further controlled by adding a selected mass of hydrated hydroxide to the starting material mixture. Further, the hydrated hydroxides contain a greater amount of hydrogen per formula unit, and mixtures of hydrated hydroxides with non-hydrated hydroxides can be designed for larger hydrogen production due to a larger quantity of hydrogen present in the starting materials.

Examples of such combined reaction systems, where both the hydrides of the first and second hydrogen production reactions are selected to be the same, and a hydroxide composition comprises both hydrated and non-hydrated hydroxides both having the same cationic species such as where the cationic species of the hydride is lithium (LiH) and the hydroxides also have lithium (LiOH) according to the present invention, can be expressed in the simplified reaction mechanism:

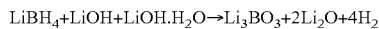
$LiBH_4+LiOH+LiOH.H_2O \rightarrow Li_3BO_3+2Li_2O+4H_2$ which generates an oxide $Li_2O$ and a complex oxide ($Li_3BO_3$) and a theoretical 9.0% by weight of hydrogen. Yet another example, where the reactants are the same, but provided at a different stoichiometry, produces different products in the following reaction:

$2LiBH_4+LiOH+2LiOH.H_2O \rightarrow Li_4B_2O_5+LiH+7H_2$ which generates a complex oxide ($Li_4B_2O_5$), a simple hydride (LiH) and a theoretical 9.2% by weight hydrogen.

The present invention provides a mixture of a hydride and a hydroxide having cationic species other than hydrogen, each one characterized by promoting the release of hydrogen from the other one, in the presence of: a catalyst, elevated temperature, or both.

The present invention also provides a method of producing a source of hydrogen gas comprising liberating hydrogen from a hydrogenated starting material comprising a hydride and a hydroxide, where the hydroxide has one or more cationic species other than hydrogen and by reacting the hydride with the hydroxide to produce a dehydrogenated product and hydrogen gas. In certain preferred embodiments, the hydrogenated starting material composition can be regenerated by exposing the dehydrogenated product (which preferably comprises an oxide composition) to hydrogen gas. As the liberating proceeds, it is preferred that the hydrogen gas is removed, both to collect the hydrogen gas as fuel for the fuel cell, and in some reaction systems to drive the reaction forward. The liberation of hydrogen gas can be conducted in the presence of an appropriate catalyst contacting the starting material composition to facilitate hydrogen release.

In preferred embodiments of the present invention, a hydrogen production reaction is conducted by a solid-state reaction, where the starting materials are in particulate form. The desirable particle size of the starting materials is related to its hydrogen release performance. Particles which are too coarse extend the time for the hydrogen release reaction at a given temperature. As will be discussed in more detail below, a smaller particle size may contribute to overcoming activation energy barriers by increasing the surface area interface between the hydrogenated starting material reactants. Further, it is preferred that the starting material reactants are essentially homogeneously mixed together, to enhance the reactivity of the mixture of hydrogenated starting material reactants. By "essentially homogeneously mixed" it is meant that the different starting material reactants are distributed with one another sufficiently that the reaction rate is not significantly inhibited by isolation of reactant particles from one another. It is preferred that starting material particles have a size on the order of 100 micrometers (μm), which can be achieved by ball milling for 1 to 10 hours, for example, to form a suitable starting material. Preferably the particle size of the reactants is on the order of less than about 10 micrometers, and most preferably less than 1 micrometer.

Example 1

This example demonstrates the hydrogen storage material system where MI and MII are selected to be lithium in the hydrogen storage material system. An equal molar ratio of lithium hydride (LiH) and lithium hydroxide (LiOH) were weighed at 0.248 g of LiH and 0.756 g of LiOH and were mixed to form the hydrogenated mixture the hydrogen storage media system, that releases hydrogen according to the following reaction to produce hydrogen:

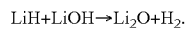
$LiH+LiOH \rightarrow Li_2O+H_2$.

The mixing was accomplished using standard ball milling techniques at room temperature under ambient conditions for 60 minutes. Some hydrogen generation was noted during the milling process. The mixture was then heated at a rate of 2° C. per minute up to a maximum temperature of 300° C. while under ambient conditions and analyzed by a modified Sievert's apparatus, where the volumetric gas absorption is measured and converted to a weight percentage.

This analysis is shown in FIG. 1, where a total of 5.3 weight % was generated (with the difference between the theoretical 6.25 weight % being attributed to the hydrogen generated and either lost during the milling process or due to impurities in the starting materials). From the graph, it is apparent that hydrogen generation begins at about 80° C. and accelerates at approximately 170° C.

Example 2

The hydrogen storage material system is the same as that in Example 1. Equal molar ratios of lithium hydroxide (LiOH) and lithium hydride (LiH) with measured amounts of 0.249 g LiH and 0.749 g of LiOH were mixed together and mechanically milled using the same ball milling techniques as described in Example 1, except that the mixture was milled for a shorter duration of 12 minutes.

Example 3

A hydrogen storage material system where the hydride is lithium hydride (LiH) and the hydroxide is lithium hydroxide (LiOH), similar to Example 2 above, is reacted in the presence of a catalyst, titanium chloride, $TiCl_3$. A mixture of an equal molar ratio of lithium hydride (LiH) and lithium hydroxide (LiOH) weighed as 0.201 g LiH and 0.611 g of LiOH were mixed with one another. The catalyst was further added during milling at 10 mol % weighed at 0.385 $TiCl_3$, and the entire mixture was then milled for 12 minutes.

The resulting samples from Examples 2 and 3 were subjected to a modified Sievert's analysis, where heat was applied in increasing steps. The first heating step reached a temperature of 100° C. (point A), the second step ramps up to 200° C. (point B) and then the final step reached 250° C. (point C). As can be observed from the data, the hydrogen generation began at approximately 80° C. for the Sample from Example 2 without a catalyst. As the temperature was held constant through the first step at 100° C., the rate of hydrogen generation in the Example 2 Sample slowed reaching only approximately 0.7 weight percent. Increasing the temperature to the next step of 200° C. increased the amount of hydrogen generated, but as the sample remained at 200° C. the rate of hydrogen generation slowed. As the sample temperature was again elevated, to the 250° C. interval, a similar behavior was observed, where hydrogen production slowed at constant temperature. After increasing to 250° C., 5.7 wt. % of hydrogen was generated. This amount is closer to the theoretical hydrogen amount of 6.25 wt. % and the amount in Example 1, and is attributed to less hydrogen generated or lost during the milling process.

Figure 2:
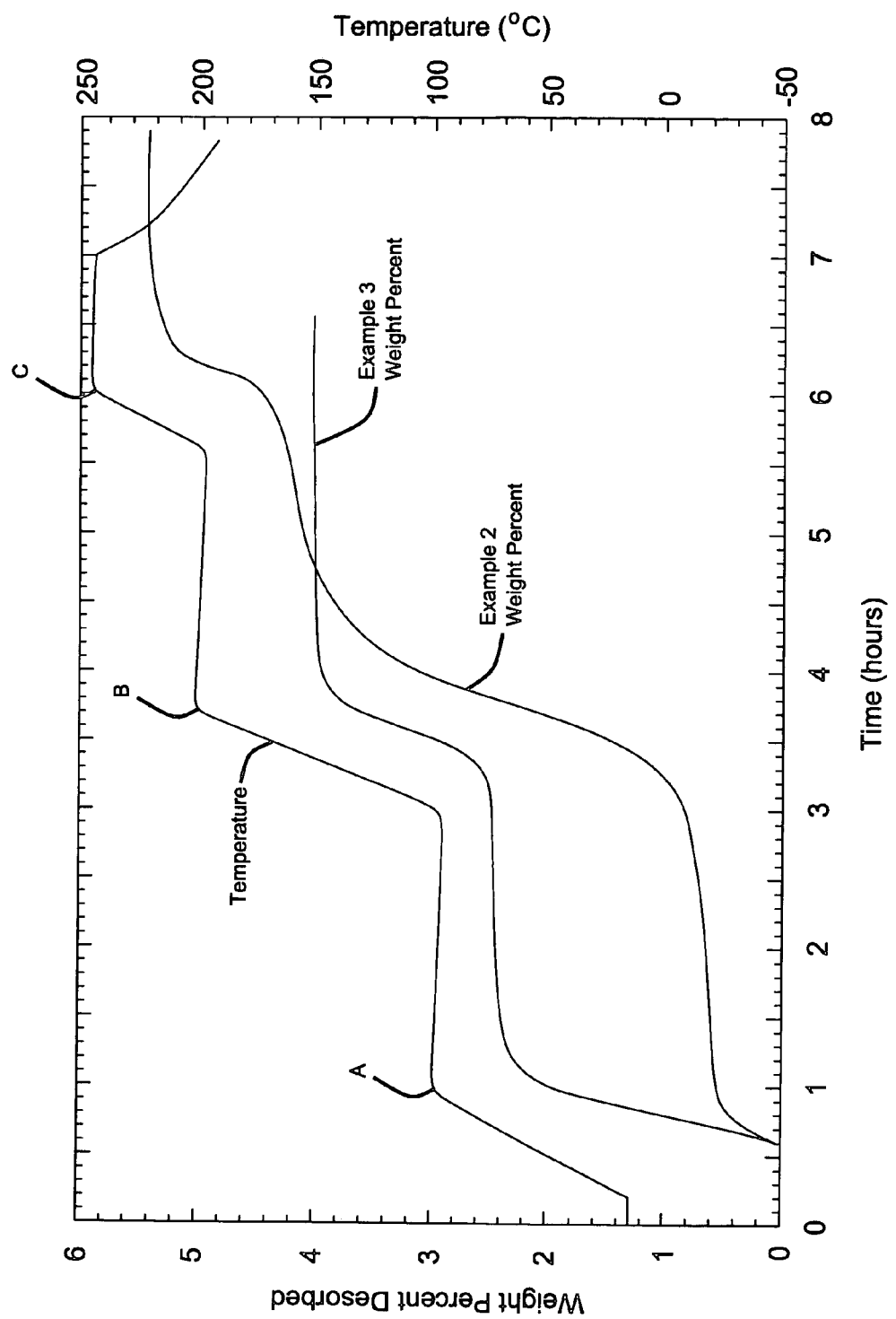
FIG. 2 is a graph showing hydrogen production for a hydrogen storage material comparing a first sample comprising lithium hydride and lithium hydroxide and a second sample comprising lithium hydride, lithium hydroxide, and a catalyst, where temperature is incrementally increased in a modified Sievert's apparatus.

The data shown in FIG. 2 suggests that there is an activation energy barrier for this exothermic reaction that occurs at about 80° C., where the hydrogen release initiates. As can be observed from the data, the presence of a catalyst during the hydrogen generation reaction significantly accelerates hydrogen evolution. For example, at 100° C., only approximately 0.7 wt. % hydrogen was produced for the mixture made in Example 2 without a catalyst, as where approximately 2.7 wt. % hydrogen was generated at 100° C. for the mixture of Example 3 with 10 mol. % catalyst. The overall lower quantity of hydrogen produced in the Example 3 sample is likely attributed to premature production of hydrogen during the milling process.

The behavior of the hydrogen storage material, system in both FIGS. 1 and 2 shows that the hydrogen production reaction is kinetically limited. The sample from Example 3 where the catalyst was added demonstrates that the catalyst facilitates greater hydrogen release at relatively low temperatures. Due to the fact that the hydrogen production reaction in the lithium hydride and lithium hydroxide system is exothermic, the thermodynamic equilibrium state corresponds to a nearly complete reaction at room temperature. It is also possible that product (such as, solid phase byproduct oxide composition or hydrogen gas) accumulating where the reaction is occurring in the hydrogen storage material mixture may inhibit full release of hydrogen from the storage material. The reaction can be driven towards complete release of hydrogen by addressing both the activation energy barrier and the inhibition by product build-up through various means recognized by one of skill in the art.

For example, as previously discussed, mixing the solid reactant particles in an essentially homogenous mixture on a fine scale facilitates greater hydrogen release from the hydrogen storage compositions. Also, suitable catalysts (such as the $TiCl_3$ in Example 3) may be selected to facilitate the reaction and drive it to completion by overcoming any initiation/activation energy barriers. Exemplary catalysts suitable for use with the present invention include for example, compounds comprising elements selected from the group consisting of Ti, V, Cr, C, Fe, Mn, Ni, Si, Al, Nb, Pd, and mixtures thereof. Such catalyst compounds may be selected in elemental form, or may comprise hydride, halide, oxide, or nitride compounds, for example. A non-limiting list of such catalyst compounds includes: $TiCl_3$, $TiO_2$, $TiN$, $V_2O_5$, $SiO_2$, $Nb_2O_5$, and $Al_2O_3$, for example.

Further, products may be removed as the reaction proceeds. For example, hydrogen gas will easily be removed, and methods of solid-solid separation recognized by one of skill in the art may be employed to address the accumulation of solid phase oxide compositions in the hydrogen storage materials. Additionally, as will be discussed in greater detail below, one preferred embodiment of the present invention initiates the hydrogen production reaction by providing heat via a second exothermic reaction to overcome the activation energy barrier of the hydrogen production reaction. This exothermic initiation reaction transfers heat to the solid-state reactants in an amount sufficient to initiate the subsequent hydrogen generation reaction with one another.

Example 4

Figure 3:
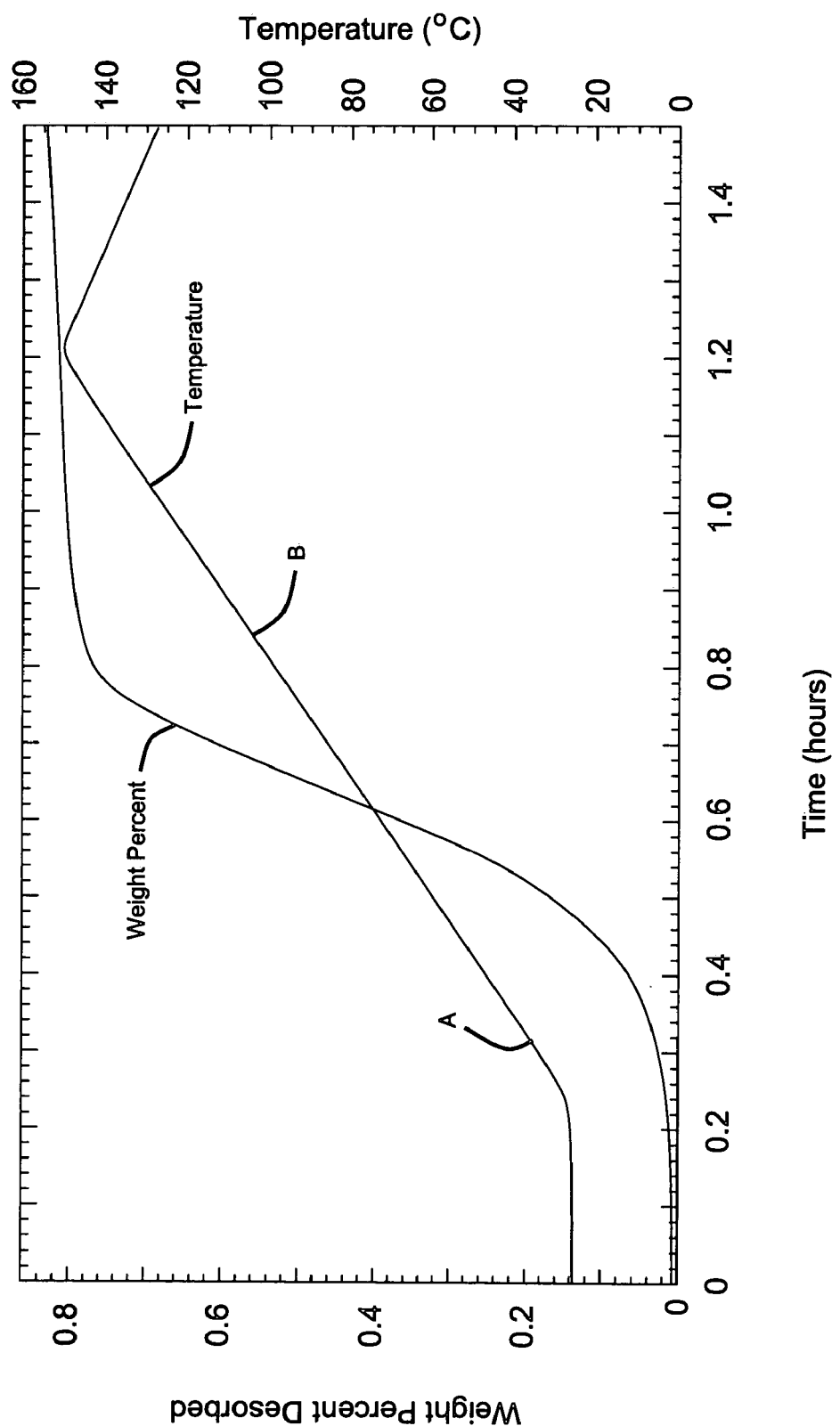
FIG. 3 is a graph showing hydrogen production over time for a hydrogen storage material comprising sodium hydride and lithium hydroxide from a modified Sievert's apparatus analysis.

In Example 4, a mixed cation hydrogen storage material system is provided where MI is selected to be sodium and MII is selected to the lithium. An equal molar ratio of sodium hydride (NaH) and lithium hydroxide (LiOH) weighed as 0.655 g NaH and 0.652 g of LiOH, was mixed and ground by conventional ball milling techniques. A considerable amount of hydrogen generation was noted during the milling process (by an audible gas release when opening the milling vessel). The milled mixture was then analyzed by a modified Sievert's apparatus as shown in FIG. 3. As can be observed from the data, hydrogen generation begins at approximately 40° C. (point A) and is complete at approximately 100° C. (point B). Approximately 0.8 wt. % of hydrogen was generated, which is less than the theoretical yield of 4.1 weight percent, however as noted above, a large unquantified amount of hydrogen was produced during milling, which would likely approach the theoretical yield when accounted for.

Example 5

Figure 4:
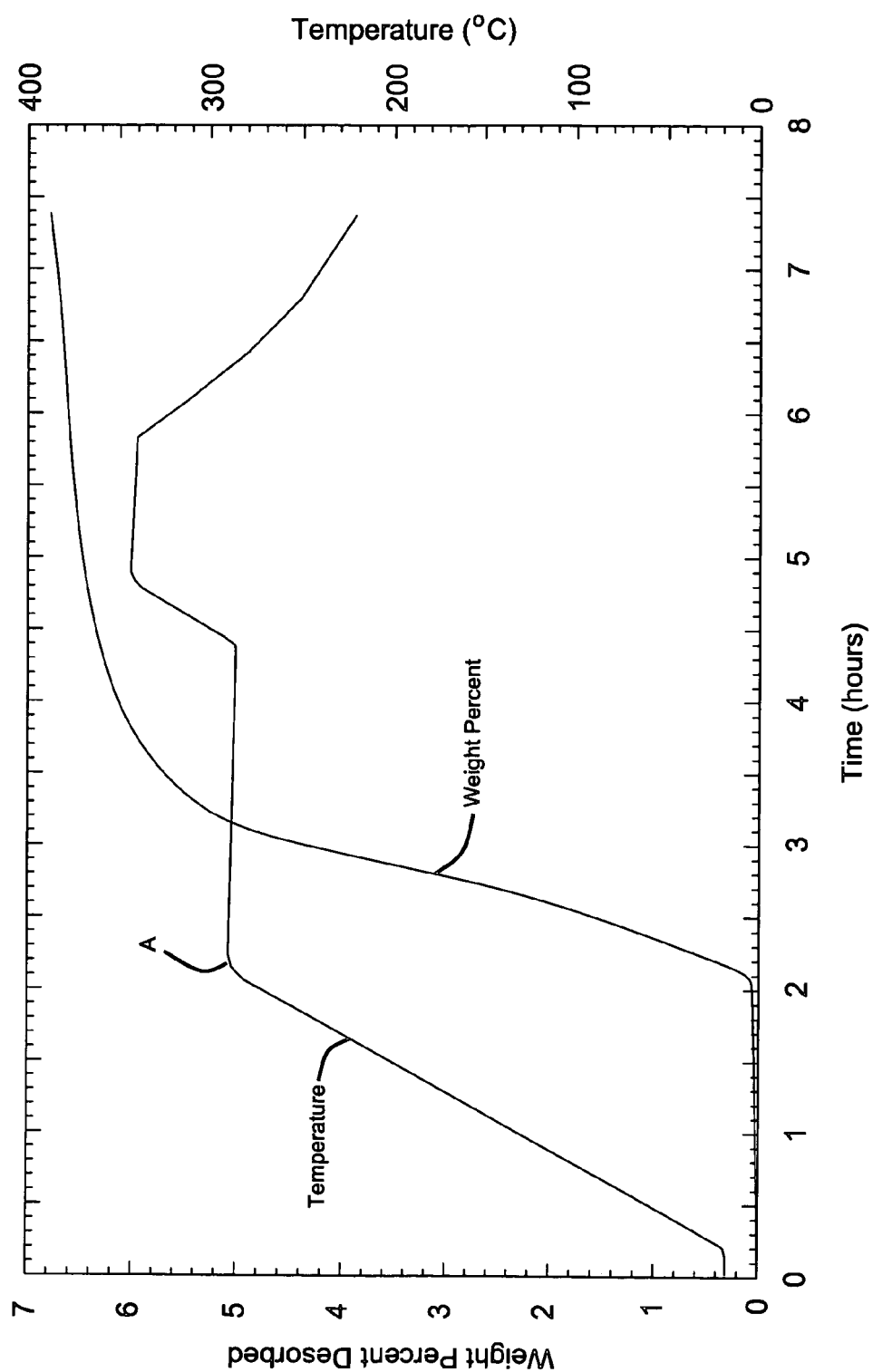
FIG. 4 is a graph showing hydrogen production over time for a hydrogen storage material comprising a complex hydride of lithium borohydride and lithium hydroxide from a modified Sievert's apparatus analysis.

A mixed cation hydrogen storage material system where the hydride is a complex hydride (i.e., lithium borohydride where MI is selected to be lithium) and a hydroxide where MII is selected to the lithium forming lithium hydroxide. An equal molar ratio of lithium borohydride (LiBH$_4$) and lithium hydroxide (LiOH) weighed as 0.224 g LiBH$_4$ and 0.981 g of LiOH, was mixed and then milled for 1 hour. The sample of Example 5 was analyzed by a modified Sievert's analysis as the results shown in FIG. 4. Hydrogen generation appears to commence at approximately 250° C., however, with addition of a catalyst (such as in Example 3), the reaction kinetics should be modified to produce hydrogen at lower temperatures. A maximum of 6.6 wt. % hydrogen was produced, which is close to the theoretical yield of 6.8 wt. %.

In accordance with the behavior observed during the Sievert's testing of the hydrogen storage material systems, it is preferred that the hydrogen production reaction between the hydroxide compositions and hydride compositions is conducted at an elevated temperature above ambient conditions, primarily to increase the rate of reaction, as well as overcoming any initiation activation barriers. Although this specific temperature varies for the thermodynamics of the particular reaction, which is dependent upon the cationic species selected, certain preferred embodiments of the present invention conduct a reaction at a temperature of above about 40° C. Other preferred embodiments of the present invention preferably are conducted at a temperature of about 80° C. or higher.

Additionally, a compressive force may be applied on the solid starting materials while conducting the hydrogen production reaction of the present invention to increase physical contact between the particles and to enhance the reaction. However, in such an embodiment where compressive force is applied to the starting materials, it is preferred that the compressive force is applied in such a manner so as not to prevent hydrogen gas formation or release. For example, the compressive force may be applied with platens formed of porous material, which permits gas to travel therethrough, as it is generated within the starting materials.

Preferred embodiments of the present invention provide for a regeneration reaction of one or more species of a starting material by utilizing a product of the hydrogen production reaction, where the hydrogen production reaction is generally non-reversible when exposing the byproducts to hydrogen. A reaction is conducted between a first hydrogen storage material composition and a second hydrogen storage material composition, for a time and at a temperature sufficient to produce hydrogen (H$_2$) and an oxide composition, where the first hydrogen storage material comprises a hydride and where the second hydrogen storage material comprises a hydroxide having one or more cationic species other than hydrogen. A regeneration reaction is conducted utilizing the oxide composition to form a species of a hydride or a hydroxide. It is preferred that the hydride of the first starting material composition has one or more cationic species other than hydrogen, and that the oxide composition comprises at least one of the one or more cationic species other than hydrogen derived from with the hydride or the hydroxide, respectively. The hydrogen production reaction is preferably the same as the previous embodiments described above.

One preferred embodiment of the present invention comprises a method for releasing hydrogen from hydrogen storage materials comprising conducting an exothermic hydrogen production reaction between a first hydrogen storage material and a second hydrogen storage material to produce hydrogen and a byproduct material comprising an oxide. The first hydrogen storage material preferably comprises a hydride composition represented by MI$^x$H$_x$, and where the second hydrogen storage material comprises a hydroxide composition represented by MII$^y$(OH)$_y$, where MI and MII represent a cationic species or a mixture of cationic species other than hydrogen, and where x and y represent average valence states of respectively MI and MII. The method further comprises conducting a regeneration reaction with the oxide composition to form a species of either a hydride or a hydroxide.

In an alternate preferred embodiment, a method of producing a source of hydrogen gas is provided which comprises producing hydrogen by conducting a hydrogen production reaction in a hydrogenated starting material composition comprising a hydride and a hydroxide having one or more cationic species other than hydrogen, to produce hydrogen gas and a dehydrogenated reaction product comprising an oxide, and conducting a regeneration reaction by utilizing the dehydrogenated reaction product to form a hydrogenated material.

The present invention contemplates a regeneration reaction which comprises a single regeneration reaction or a plurality of distinct reactions to form a hydrogenated material. The hydrogenated material produced in the regeneration reaction may be different from the hydrogenated starting material. Where the hydrogenated material is regenerated to be the same as the hydrogenated starting material, preferred embodiments employ a plurality of reaction steps to regenerate the starting materials to form the same species of a hydride, hydroxide, or both. Thus, in certain preferred embodiments, the regeneration reaction forms the hydrogenated material which comprises at least one of either the hydride or the hydroxide of the hydrogenated starting material. In particularly preferred embodiments, the regeneration reaction forms both the hydride and the hydroxide of the hydrogenated starting material.

As previously discussed, a non-reversible reaction is one where the regeneration of the starting materials by merely exposing a byproduct composition to hydrogen is technically or commercially impractical. Thus, additional regeneration reactions conducted by utilizing the reaction byproduct in a variety of different reactions can form the starting material hydride and hydroxide at commercially practicable conditions. In one preferred embodiment, the regeneration reaction comprises reacting an oxide composition with water to form a hydroxide species. As appreciated by one of skill in the art, the oxide compound may comprise different cationic species or mixture of species (which are formed during the reaction between the hydride and hydroxide where MI and MII comprise a different cationic species). When the oxide compound (s) is used to regenerate a species of a hydride or hydroxide, it may form a starting material species which is different from the original starting material. However, the hydroxide that is formed is nonetheless rehydrogenated and capable of reacting in another hydrogen production reaction. The reaction between an oxide compound and water is typically exothermic, with no requirement for inputting energy into the system. In the case where the cationic species is lithium for both MI and MII in the hydride (LiH) and hydroxide (LiOH), the hydrogen production reaction forms Li$_2$O and the regeneration reaction proceeds by:

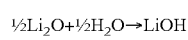

½Li$_2$O+½H$_2$O→LiOH and generates a heat of reaction (ΔH$_r$) of approximately −42 kJ/mol-LiOH. Further, in the circumstance where the cationic species MI and MII are the same in both starting materials, the same hydroxide species as the original starting material hydroxide is formed by the regeneration reaction.

The regeneration of a species of a hydride material from an oxide composition is generally more energy intensive than the regeneration of an oxide species. The present invention contemplates a variety of reaction mechanisms and processing conditions which will effectively regenerate a hydrogenated hydride species from an oxide composition byproduct (from the hydrogen production reaction). Thus, one preferred embodiment of the present invention to regenerate a hydride comprises reacting a reductant, hydrogen, and an oxide composition together to form a hydrogenated material comprising a hydride. The reductant is oxidized in the presence of oxygen (which is generally in the form of oxygen present in the oxide composition), and thus functions to reduce the cationic species present in the oxide composition. Thus, the reductant preferably possesses more than one oxidation state to engage in an oxidation-reduction reaction.

In one preferred embodiment of the present invention the reductant comprises carbon. Where the reductant contains carbon, the reaction generally proceeds by a so-called "carbothermal reduction" reaction, which are generally endothermic and require thermal energy. The carbon may be provided in the form of elemental carbon (C) or carbon monoxide (CO), for example. Exemplary regeneration reactions of a reductant comprising carbon proceed as follows. Where MI and MII are selected as lithium in the hydrogen production reaction, and $Li_2O$ is formed, the regeneration reaction proceeds by:

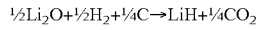

where lithium hydride is regenerated and a secondary byproduct compound, carbon dioxide is formed. Carbon dioxide is a preferred secondary byproduct compound, because it can be easily separated from the solid hydride, as it is in gaseous form and does not require special handling or processing after formation. This regeneration reaction is endothermic, with a heat of reaction ($\Delta Hr$) of approximately +110 kJ/mol-LiH, and thus heat is generally applied to the staffing materials to drive the reaction.

Another preferred regeneration reaction where a reductant comprises carbon is where the reductant is carbon monoxide (CO). Where $Li_2O$ is the oxide composition formed in the hydrogen production reaction, it can be utilized to regenerate the hydride composition by the following reaction mechanism:

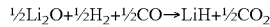

where the $\Delta H_r$ is approximately +67 kJ/mol-LiH. This reaction is likewise endothermic and requires heat to drive the reaction, although less than the embodiment where the reductant is elemental carbon (C).

In selecting a reductant comprising carbon there are various considerations, which can be tailored to the application, while factoring in processing capabilities. Thus, while elemental carbon (C) requires a greater heat input, it also has a greater reducing power (because it has a lower oxidation state). However, the carbon monoxide (CO) requires less of a thermal input, while having a slightly diminished reducing power (with a higher oxidation state). Both exemplary reductants comprising carbon generate carbon dioxide gas as a secondary byproduct, which is a highly desirable byproduct for ease of handling. It is preferred that where a reductant comprising carbon is used, the regeneration reaction is carried out in an inert atmosphere (e.g., nitrogen or argon), with excess hydrogen gas ($H_2$), excess reductant, and continuous $CO_2$ removal to drive the regeneration reaction to completion.

In alternate preferred embodiments, a carbothermal reduction reaction can be used to regenerate a hydride from a hydroxide. As previously discussed, the reaction of an oxide with water readily form a hydroxide. In the present embodiment, all of the byproduct oxide from the hydrogen production reaction is reacted with water to form hydroxide. Then, a portion of the newly regenerated hydroxide may be regenerated to form a hydride. For example, in a first regeneration reaction (where the hydrogen production reaction was between LiH and LiOH to produce $Li_2O$) between an oxide and water proceeds as follows:

$$\tfrac{1}{2}Li_2O + \tfrac{1}{2}H_2O \rightarrow LiOH.$$

The regenerated species of hydroxide, LiOH, may then be regenerated by either of the following carbothermal reduction reactions:

$$LiOH + CO \rightarrow LiH + CO_2$$

(where the reductant is selected as carbon monoxide) or $$LiOH + \tfrac{1}{2}C \rightarrow LiH + \tfrac{1}{2}CO_2$$

(where the reductant is selected as elemental carbon).

Yet another preferred embodiment of the present invention comprises regeneration of the species of a hydride from the oxide composition by using certain preferred metal reductants. Thus, the present invention contemplates use of metals which form stable oxide compounds as reductants, and the list of metals set forth herein are merely exemplary and non-limiting. Such reductants comprise magnesium (Mg), aluminum (Al), titanium (Ti), and mixtures thereof. Thus, in an exemplary set of reactions, where the oxide composition is $Li_2O$, preferred regeneration reactions are conducted by the following non-limiting examples:

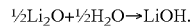

with a heat of reaction ($\Delta H_r$)=−91.5 kJ/mol-$H_2$, which is exothermic, and forms a secondary byproduct compound, MgO. Another reaction comprises

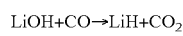

with a heat of reaction ($\Delta H_r$)=−70.3 kJ/mol-$H_2$, which is exothermic, and forms a an oxide byproduct compound, $Al_2O_3$. Another exemplary reaction comprises titanium as a reductant and proceeds according to the reaction:

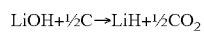

with a heat of reaction ($\Delta H_r$)=−62.5 kJ/mol-$H_2$, which is exothermic, and forms a secondary byproduct compound, TiO. As will be appreciated by one of skill in the art, metals are particularly well suited as reductants due to their multiple oxidation states and ability to behave as a reductant in systems with oxygen present.

Another preferred embodiment of the present invention is a multi-stage reaction to regenerate a species of a hydride from the oxide composition. Further, according to the present embodiment, the byproduct compounds of the regeneration reaction can further be reacted in a subsequent regeneration reaction, to form desirable byproduct compounds, to regenerate a reductant, or to achieve both objectives. Generally, one or more byproduct compounds of the regeneration reaction comprise a reductant, which has a higher oxidation state after the regeneration reaction, because it is oxidized during the regeneration reaction. Thus, the reductant has a higher oxidation state as compared to an original oxidation state prior to said regeneration reaction.

In accordance with the present embodiment of multi-stage regeneration reactions, preferred reductants to achieve the reduction of the hydride compound comprise: Si, Cr, Zn, Fe, and mixtures thereof. Further, the above embodiments disclosing metal reductants, such as Mg, Al, and Ti, also form oxide byproduct compounds, which can likewise be reacted in a second stage reaction. An intermediate oxide compound is formed from the oxide composition formed in the hydrogen production reaction. In a first stage reaction, a first reductant is mixed with hydrogen gas and the oxide byproduct composition, to form a species of regenerated hydride product and an intermediate oxide compound comprising the reductant. The intermediate oxide compound comprising the reductant is then reacted in a second stage reaction, where it is reduced by an additional second reductant compound, which regenerates and reduces the first reductant, while forming a more desirable regeneration reaction byproduct compound.

One advantage to using a multi-stage regeneration process is that for the staged regeneration reactions, the endothermic heat necessary for each respective stage is less than the overall total enthalpy required. By breaking the energy requirements into smaller increments can be more manageable and efficient in industrial applications. The following are exemplary regeneration reactions using Si, Cr, Zn, and Fe, respectively to regenerate an oxide composition of $Li_2O$ generated from a hydrogen production reaction between LiH and LiOH.

Where the reductant is selected to be silicon (Si) the regeneration reaction first stage reaction is:

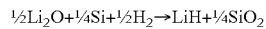

with a heat of reaction $(\Delta H_r) = -19$ kJ, which is exothermic, and forms a secondary byproduct compound, here an oxide intermediate (i.e., $SiO_2$) comprising a first reductant Si, which is in a higher oxidation state than prior to the regeneration reaction. The second stage reaction proceeds by introducing an additional second reductant, here selected as CO, by the reaction mechanism:

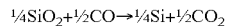

which has a $\Delta H_r = +86$ kJ. The first reductant, Si, is regenerated and restored to a lower oxidation state, corresponding to its original oxidation state prior to the regeneration reaction. The additional reductant, CO, is oxidized to form $CO_2$ gas, which is readily removed from the solid phase product and easily processed and handled. As appreciated by one of skill in the art, during the second reaction, energy must be provided to the system for the endothermic carbothermal reduction reaction. The overall enthalpy change for the regeneration reaction, comprising the first and second stage reactions, is $\Delta H = +67$ kJ.

Another first reductant selected according to the present embodiment, is chromium (Cr). The first stage of the regeneration reaction proceeds by

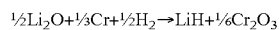

where $\Delta H_r = +18$ kJ, and is endothermic. A second stage of the regeneration reaction proceeds according to:

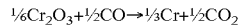

with a $\Delta H_r = +48$ kJ, where the second additional reductant is selected as CO. Where the secondary byproduct compound intermediate oxide formed is $Cr_2O_3$, its stability in the system is less favored by thermodynamics (as reflected in an endothermic $\Delta H_r$, compared with the embodiment where stable $SiO_2$ is formed by an exothermic $\Delta H_r$), and may require more extensive temperature, pressure, and atmospheric controls. The overall enthalpy change for this system is predicted to be $\Delta H = +66$ kJ, however one advantage of the present embodiment is that the overall enthalpy change is divided between the first and second stage reactions, making processing more manageable by dividing the required heat into multiple processing stages.

Yet another embodiment is where a first reductant is selected to be zinc (Zn). The first stage regeneration reaction proceeds by:

with a $\Delta H_r = +33$ kJ. The second stage regeneration reaction proceeds according to:

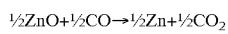

with a $\Delta H_r = +33$ kJ, where CO is selected as the additional second reductant. The formation of the ZnO oxide composition appears to be thermodynamically less stable than previous embodiments. The overall enthalpy change for the overall regeneration reaction is $\Delta H = +66$ kJ.

Another alternate embodiment of the present invention is where the first reductant in a two-stage regeneration reaction system is selected to be iron (Fe). In the first stage regeneration reaction, the reaction mechanism is as follows:

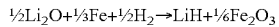

that has a $\Delta H_r = +71$ kJ. The second regeneration reaction between the intermediate iron oxide $Fe_2O_3$ and a second additional reductant, CO, proceed by:

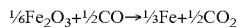

with a $\Delta H_r = -4$ kJ. The $Fe_2O_3$ is less thermodynamically favored to form a stable compound than previous intermediate oxides in the previously discussed embodiments. The overall enthalpy change for the overall regeneration reaction system is $\Delta H = +67$ kJ. As recognized by one of skill in the art, the above reductants may be regenerated in alternate second stage reactions which are not carbo-thermal. Such reactions and procedures are common for many of the oxide byproduct compounds disclosed to form an elemental form of the oxide compound, as recognized by one of skill in the art, and such procedures may be used in conjunction with the present invention.

An alternate preferred embodiment of the present invention comprises a regeneration reaction between hydrogen, an oxide composition, and a reductant selected to be hydrazine ($N_2H_4$). In preferred embodiments, the hydrazine regenerates both a species of a hydride and a hydroxide of the starting materials. An exemplary reaction where the oxide composition is $Li_2O$ (formed by the hydrogen production reaction between LiH and LiOH) is as follows:

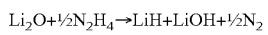

with a $\Delta H_r$ of approximately $-21$ kJ/mol, which is exothermic and thermodynamically favorable. There is a potential for competing reactions to occur when hydrazine is selected as the reductant, producing ammonia, for example. However, breaking the N—N bond in hydrazine generally translates to an activation energy barrier. Such an activation energy barrier minimizes formation of ammonia, and can be controlled by reaction conditions (e.g., temperature and pressure). Further, hydrogen could potentially be generated between the newly formed hydride and hydroxide products, but these competing reactions can be controlled by properly controlling temperature, pressure, and selective catalysis by providing catalysts in the hydrogen storage material, which promote the regeneration reaction, as recognized by one of skill in the art. Further, the regeneration reaction where the reductant is hydrazine is particularly useful for mobile applications, where the hydrogen storage material system may be regenerated at the point-of-use (e.g., on-board) mobile application having a fuel cell.

Thus, according to preferred embodiments of the present invention, a regeneration reaction comprises reacting a reductant, hydrogen, and an oxide together to form a species of a hydrogenated hydride material. The reductant is preferably selected from the group consisting of: carbon (C), carbon monoxide (CO), magnesium (Mg), aluminum (Al), titanium (Ti), silicon (Si), chromium (Cr), zinc (Zn), iron (Fe), hydrazine ($N_2H_2$), and mixtures thereof. As appreciated by one of skill in the art, the reductants may be mixed with one another to conduct the regeneration reaction, or may be staged in a plurality of regeneration reactions with different reductants, some examples of which were discussed above.

Thus, the hydrogen storage materials according to the present invention provide solid phase hydrogen storage, which is especially advantageous in fuel cell applications, and most especially in mobile fuel cell applications. Such hydrogen storage material compositions are generally widely available, and of relatively low molecular weight, which facilitates improving the efficiency of the fuel cell unit. Additionally, the system of hydrogen production reactions available from the variants of the present invention have relatively low total enthalpy changes, which reduces the need for extensive control and cooling systems, as well as eliminating parasitic energy demands from the fuel-cell system. The present invention also provides methods and compounds for regeneration of a species of a hydride or hydroxide, which facilitate regeneration of starting materials for the hydrogen production reaction, allowing for relatively low energy and facile regeneration of hydrogen storage materials.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for releasing hydrogen from hydrogen storage materials comprising:
    conducting a hydrogen production reaction by reacting particles of a first hydrogen storage material composition with a substantially chemically equivalent amount of particles of a second hydrogen storage material composition, the reaction being between initially solid particles and for a time and at a temperature sufficient to produce hydrogen ($H_2$) and a solid oxide composition, where said first hydrogen storage material comprises a first hydride and where said second hydrogen storage material comprises a first hydroxide having one or more cationic species other than hydrogen; and
    conducting a regeneration reaction utilizing said oxide composition to form a species of a second hydride, a second hydroxide, or both.

2. The method according to claim 1 wherein each of said first and second hydrides has one or more cationic species other than hydrogen and said oxide composition comprises at least one of said one or more cationic species other than hydrogen derived from said first hydride, said first hydroxide, or both.

3. The method according to claim 2 wherein said first hydride and said second hydride are different from one another.

4. The method according to claim 2 wherein said first hydride and said second hydride are the same.

5. The method according to claim 2 wherein said first hydroxide and said second hydroxide are different from one another.

6. The method according to claim 2 wherein said first hydroxide and said second hydroxide are the same.

7. The method according to claim 1 wherein said first hydride is represented by the formula: $MI^xH_x$, where MI represents said one or more cationic species other than hydrogen and x represents an average valence state of MI.

8. The method according to claim 1 wherein said first hydroxide is represented by the formula: $MII^y(OH)_y$, where MII represents said one or more cationic species other than hydrogen and y represents an average valence state of MII.

9. The method of claim 1 wherein said first hydride is represented by $MI^xH_x$ and said first hydroxide is represented by $MII^y(OH)_y$, where MI and MII respectively represent said one or more cationic species other than hydrogen, and x and y represent average valence states of MI and MII, respectively.

10. The method of claim 9 wherein MI and MII are the same cationic species.

11. The method of claim 9 wherein MI is a complex cationic species comprising two distinct cationic species.

12. The method of claim 9 wherein MII is a complex cationic species comprising two distinct cationic species.

13. The method according to claim 1 wherein said first hydride is selected from the group consisting of: lithium hydride (LiH), lithium borohydride ($LiBH_4$), lithium alanate ($LiAlH_4$), and mixtures thereof.

14. The method according to claim 1 wherein said second hydroxide is lithium hydroxide (LiOH).

15. The method according to claim 1 wherein said first hydride comprises LiH and said first hydroxide comprises LiOH.

16. The method according to claim 15 wherein said hydrogen production reaction proceeds according to a reaction mechanism of $LiH + LiOH \rightarrow Li_2O + H_2$.

17. The method according to claim 1 wherein said first hydride comprises $LiBH_4$ and said first hydroxide comprises LiOH.

18. The method according to claim 17 wherein said hydrogen production reaction proceeds according to a reaction mechanism of $LiBH_4 + 4LiOH \rightarrow LiBO_2 + 2Li_2O + 4H_2$.

19. The method according to claim 1 where said hydride comprises $LiBH_4$ and said hydroxide comprises LiOH.

20. The method according to claim 19 where said reaction proceeds according to a reaction mechanism of $LiBH_4 + 4LiOH \rightarrow LiBO_2 + 2Li_2O + 4H_2$.

21. The method according to claim 1 wherein said oxide composition comprises $Li_2O$ and said regeneration reaction proceeds according to the reaction mechanism $½Li_2O + ½H_2O \rightarrow LiOH$.

22. The method according to claim 1 wherein said regeneration reaction further comprises the following reaction mechanism $LiOH + ½C \rightarrow LiH + ½CO_2$.

23. The method according to claim 1 wherein said regeneration reaction further comprises the following reaction mechanism $LiOH + CO \rightarrow LiH + CO_2$.

24. The method according to claim 1 wherein said oxide composition comprises $Li_2O$ and said regeneration reaction proceeds according to the reaction mechanism $½Li_2O + ½H_2 + ¼C \rightarrow LiH + ¼CO_2$.

25. The method according to claim 1 wherein said oxide composition comprises $Li_2O$ and said regeneration reaction proceeds according to the reaction mechanism $½Li_2O+¼Si+/1;2H_2→LiH+¼SiO_2$.

26. The method according to claim 1 wherein said oxide composition comprises $Li_2O$ and said regeneration reaction proceeds according to the reaction mechanism $½Li_2O+⅓Cr+/1;2H_2→LiH+⅙Cr_2O_3$.

27. The method according to claim 1 wherein said oxide composition comprises $Li_2O$ and said regeneration reaction proceeds according to the reaction mechanism $½Li_2O+½Zn+/1;2H_2→LiH+½ZnO$.

28. The method according to claim 1 wherein said oxide composition comprises $Li_2O$ and said regeneration reaction proceeds according to the reaction mechanism $½Li_2O+⅓Fe+½H_2→LiH+⅙Fe_2O_3$.

29. The method according to claim 1 wherein said oxide composition comprises $Li_2O$ and said regeneration reaction proceeds according to the reaction mechanism $Li_2O+½N_2H_4→LiH+LiOH+½N_2$.

30. A method of producing a source of hydrogen gas comprising: conducting a hydrogen production reaction in a solid hydrogenated starting material composition comprising particles of a starting material hydride and a substantially chemically equivalent amount of particles of a starting material hydroxide, each of said starting material hydride and said starting material hydroxide having one or more cationic species other than hydrogen, to produce hydrogen gas and a solid dehydrogenated reaction product comprising an oxide; and conducting a regeneration reaction by utilizing said dehydrogenated reaction product to form a regenerated hydrogenated material.

31. The method according to claim 30 wherein said regeneration reaction comprises a plurality of reactions to form said regenerated hydrogenated material.

32. The method according to claim 30 wherein said regenerated hydrogenated material is different than said hydrogenated starting material.

33. The method according to claim 30 wherein said regenerated hydrogenated material is the same as said hydrogenated starting material.

34. The method according to claim 30 wherein said regeneration reaction forms said regenerated hydrogenated material comprising a regenerated hydride, a regenerated hydroxide, or both.

35. The method according to claim 34 wherein said starting material hydride and said regenerated hydride are different from one another.

36. The method according to claim 34 wherein said starting material hydride and said regenerated hydride are the same.

37. The method according to claim 34 wherein said starting material hydroxide and said regenerated hydroxide are different from one another.

38. The method according to claim 34 wherein said starting material hydroxide and said regenerated hydroxide are the same.

39. The method according to claim 30 wherein said regeneration reaction comprises said oxide reacting with water to form said regenerated hydrogenated material comprising a regenerated hydroxide.

40. The method according to claim 39 wherein said regeneration reaction proceeds according to the reaction mechanism $½Li_2O+½H_2O→LiOH$.

41. The method according to claim 30 wherein said regeneration reaction comprises reacting a reductant, hydrogen, and a regenerated hydroxide species together to form said regenerated hydrogenated material comprising a regenerated hydride.

42. The method according to claim 30 wherein said regeneration reaction comprises reacting a reductant, hydrogen, and said oxide together to form said regenerated hydrogenated material comprising a regenerated hydride.

43. The method according to claim 42 wherein said reductant possesses more than one oxidation state.

44. The method according to claim 42 wherein said reductant comprises carbon.

45. The method according to claim 42 wherein said reductant is selected from the group consisting of carbon (C), carbon monoxide (CO), magnesium (Mg), aluminum (Al), titanium (Ti), silicon (Si), chromium (Cr), zinc (Zn), iron (Fe), hydrazine ($N_2H_4$), and mixtures thereof.

46. The method according to claim 42 wherein said reductant is carbon (C).

47. The method according to claim 46 wherein said regeneration reaction proceeds according to the reaction mechanism $½Li_2O+½H_2+¼C→LiH+¼CO_2$.

48. The method according to claim 46 wherein said regeneration reaction proceeds according to the reaction mechanism $LiOH+½C→LiH+½CO_2$.

49. The method according to claim 42 wherein said reductant is carbon monoxide (CO).

50. The method according to claim 49 wherein said regeneration reaction proceeds according to the reaction mechanism $½Li_2O+½H_2+½CO→LiH+½CO_2$.

51. The method according to claim 49 wherein said regeneration reaction proceeds according to the reaction mechanism $LiOH+CO→LiH+CO_2$.

52. The method according to claim 42 wherein said reductant is magnesium (Mg).

53. The method according to claim 52 wherein said regeneration reaction proceeds according to the reaction mechanism $Li_2O+Mg+H_2→2LiH+MgO$.

54. The method according to claim 42 wherein said reductant is aluminum (Al).

55. The method according to claim 54 wherein said regeneration reaction proceeds according to the reaction mechanism $3Li_2O+2Al+3H_2→6LiH+Al_2O_3$.

56. The method according to claim 42 wherein said reductant is titanium (Ti).

57. The method according to claim 56 wherein said regeneration reaction proceeds according to the reaction mechanism $Li_2O+Ti+H_2→2LiH+TiO$.

58. The method according to claim 42 wherein said reductant is silicon (Si).

59. The method according to claim 42 wherein said reductant is chromium (Cr).

60. The method according to claim 42 wherein said reductant is zinc (Zn).

61. The method according to claim 42 wherein said reductant is iron (Fe).

62. The method according to claim 42 wherein said reductant is hydrazine ($N_2H_4$).

63. The method according to claim 62 wherein said oxide composition comprises $Li_2O$ and said regeneration reaction proceeds according to the reaction mechanism $Li_2O+½N_2H_4→LiH+LiOH+½N_2$.

64. The method according to claim 42 wherein said reductant has a higher oxidation state after said regeneration reaction than prior to said regeneration reaction.

65. The method according to claim 42 wherein said regeneration reaction forms said second hydrogenated material and a secondary byproduct compound comprising said reductant.

66. The method according to claim 65 wherein said secondary byproduct compound comprises a secondary byproduct compound oxide of said reductant.

67. The method according to claim 66 wherein said regeneration reaction proceeds according to the reaction mechanism $½Li_2O+¼Si+½H_2 \rightarrow LiH+¼SiO_2$.

68. The method according to claim 66 wherein said reductant is silicon (Si) and said secondary byproduct compound oxide is silicon dioxide ($SiO_2$).

69. The method according to claim 66 wherein said regeneration reaction proceeds according to the reaction mechanism $½Li_2O+⅓Cr+½H_2 \rightarrow LiH+⅙Cr_2O_3$.

70. The method according to claim 66 wherein said reductant is chromium (Cr) and said secondary byproduct compound oxide is chromium oxide ($Cr_2O_3$).

71. The method according to claim 66 wherein said regeneration reaction proceeds according to the reaction mechanism $½Li_2O+½Zn+½H_2 \rightarrow LiH+½ZnO$.

72. The method according to claim 66 wherein said reductant is zinc (Zn) and said secondary byproduct compound oxide is zinc oxide (ZnO).

73. The method according to claim 66 wherein said regeneration reaction proceeds according to the reaction mechanism $½Li_2O+⅓Fe+½H_2 \rightarrow LiH+⅙Fe_2O_3$.

74. The method according to claim 66 wherein said reductant is iron (Fe) and said secondary byproduct compound oxide is iron oxide ($Fe_2O_3$).

75. The method according to claim 66 further comprising providing an additional reductant which reacts with said secondary byproduct compound oxide and thereby reduces the oxidation state of said reductant.

76. The method according to claim 75 wherein said oxidation state of said reduced reductant is equal to an original oxidation state prior to said regeneration reaction.

77. The method according to claim 76 wherein said oxidation state of said reduced reductant is an elemental form of said reductant.

78. The method according to claim 77 wherein said secondary byproduct compound oxide of said reductant is silicon dioxide ($SiO_2$) and said elemental form of said reductant is silicon (Si).

79. The method according to claim 78 wherein said additional reductant is carbon monoxide (CO) which reacts with said silicon dioxide ($SiO_2$) according to the following reaction mechanism $¼SiO_2+½CO \rightarrow ¼Si+½CO_2$.

80. The method according to claim 77 wherein said secondary byproduct compound oxide of said reductant is chromium oxide ($Cr_2O_3$), and said elemental form of said reductant is chromium (Cr).

81. The method according to claim 80 wherein said additional reductant is carbon monoxide (CO) which reacts with said chromium oxide ($Cr_2O_3$) according to the following reaction mechanism $⅙Cr_2O_3+½CO \rightarrow ⅓Cr+½CO_2$.

82. The method according to claim 77 wherein said secondary byproduct compound oxide of said reductant is zinc oxide (ZnO), and said elemental form of said reductant is zinc (Zn).

83. The method according to claim 82 wherein said additional reductant is carbon monoxide (CO) which reacts with said zinc oxide (ZnO) according to the following reaction mechanism $½ZnO+½CO \rightarrow ½Zn+½CO_2$.

84. The method according to claim 77 wherein said secondary byproduct compound oxide of said reductant is iron oxide ($Fe_2O_3$), and said elemental form of said reductant is iron (Fe).

85. The method according to claim 84 wherein said additional reductant is carbon monoxide (CO) which reacts with said iron oxide ($Fe_2O_3$) according to the following reaction mechanism $½Li_2O+⅓Fe+½H_2 \rightarrow LiH+⅙Fe_2O_3$.

86. The method according to claim 75 wherein said additional reductant comprises carbon (C).

87. The method according to claim 75 wherein said additional reductant comprises carbon monoxide (CO).

88. The method according to claim 30 wherein said starting material hydride is represented by the formula: $MI^xH_x$, where MI represents said one or more cationic species other than hydrogen and x represents an average valence state of MI.

89. The method according to claim 30 wherein said starting material hydroxide is represented by the formula: $MII^y(OH)_y$, where MII represents said one or more cationic species other than hydrogen and y represents an average valence state of MII.

90. The method of claim 30 wherein said starting material hydride is represented by $MI^xH_x$ and said starting material hydroxide is represented by $MII^y(OH)_y$, where MI and MII respectively represent said one or more cationic species other than hydrogen, and x and y represent average valence states of MI and MII, respectively.

91. The method according to claim 30 wherein said regenerated hydroxide is represented by the formula: $MII^y(OH)_y$, where MII represents said one or more cationic species other than hydrogen and y represents an average valence state of MII.

92. The method of claim 30 wherein said regenerated hydride is represented by $MI^xH_x$ and said regenerated hydroxide is represented by $MII^y(OH)_y$, where MI and MII respectively represent said one or more cationic species other than hydrogen, and x and y represent average valence states of MI and MII, respectively.

93. A method for releasing hydrogen from hydrogen storage materials comprising:
conducting an exothermic hydrogen production reaction between particles of a first hydrogen storage material and a substantially chemically equivalent amount of particles of a second hydrogen storage material to produce hydrogen and a byproduct material comprising a solid oxide, where said first hydrogen storage material comprises a hydride composition represented by $MI^xH_x$ and where said second hydrogen storage material comprises a hydroxide composition represented by $MII^y(OH)_y$, where MI and MII represent a cationic species or a mixture of cationic species other than hydrogen, and where x and y represent average valence states of respectively MI and MII; and
conducting a regeneration reaction with said oxide composition to form a species of either a hydride or a hydroxide.

94. The method according to claim 93 wherein said regeneration reaction comprises a plurality of distinct reactions.

95. The method according to claim 93 wherein said regeneration reaction forms both species of a hydride and a hydroxide.

96. The method according to claim 93 wherein at least one of said species of hydride and hydroxide is the same as said hydride composition or said hydroxide composition.

97. The method according to claim 93 wherein both of said species of hydroxide and hydride are the same as said hydride composition and said hydroxide composition.

* * * * *

UNITED STATES PATENT AND TRADEMARK OFFICE
CERTIFICATE OF CORRECTION

| | | |
|---|---|---|
| PATENT NO. | : 7,601,329 B2 | Page 1 of 1 |
| APPLICATION NO. | : 10/787617 | |
| DATED | : October 13, 2009 | |
| INVENTOR(S) | : Vajo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1631 days.

Signed and Sealed this

Fifth Day of October, 2010

David J. Kappos
*Director of the United States Patent and Trademark Office*